April 12, 1932. E. W. LITTLE 1,853,214

RECEPTACLE FOR BIRD CAGES

Filed Sept. 22, 1930

Inventor
EARL W. LITTLE
By Owen H. Spencer
Attorney

Patented Apr. 12, 1932

1,853,214

UNITED STATES PATENT OFFICE

EARL W. LITTLE, OF INDIANAPOLIS, INDIANA

RECEPTACLE FOR BIRD CAGES

Application filed September 22, 1930. Serial No. 483,538.

This invention relates to receptacles for bird cages and the prime feature of the invention is the provision of a cup structure adapted to retain food, water or the like.

A further feature of the invention is in so attaching the receptacle that it will be practically invisible from the exterior of the cage.

A further feature of the invention is the provision of means for removably attaching the receptacle to the cage.

A further feature of the invention is the provision of means for preventing casual removal of the receptacle from the cage.

A further feature of the invention is the provision of means for preventing waste of the water or food from the receptacle.

Other objects and advantages will be hereinafter more fully set forth and pointed out in the accompanying specification.

In the accompanying drawings which are made a part of this application,

Figure 1:
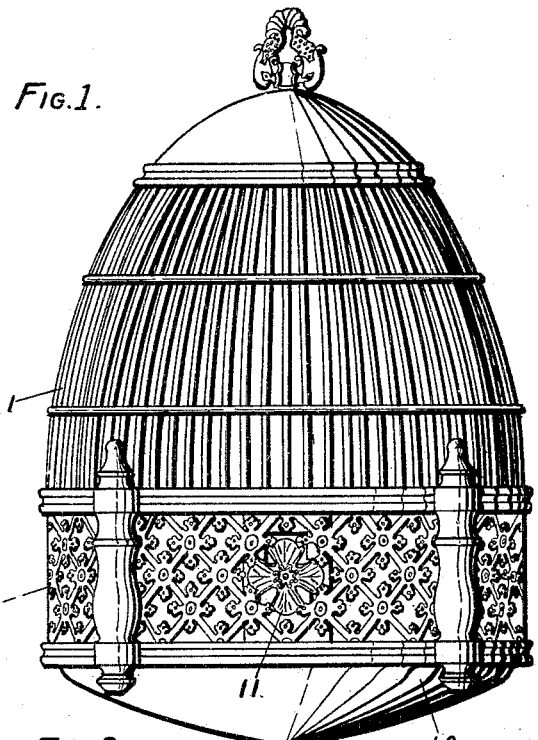
Figure 1 is a side elevation of a bird cage with the receptacle attached thereto.
Figure 3:
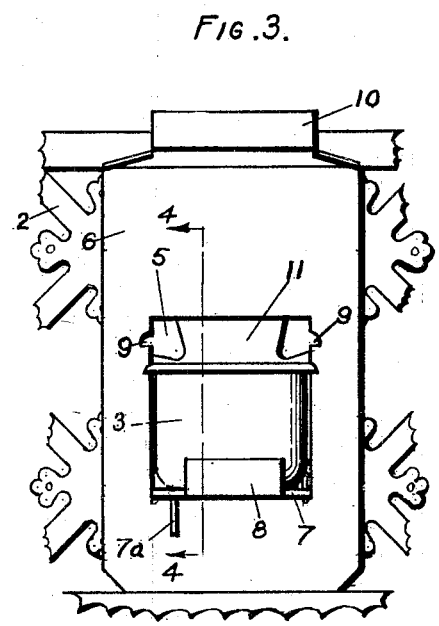
Figure 3 is an enlarged elevation of the receptacle and parts associated therewith.
Figure 2:
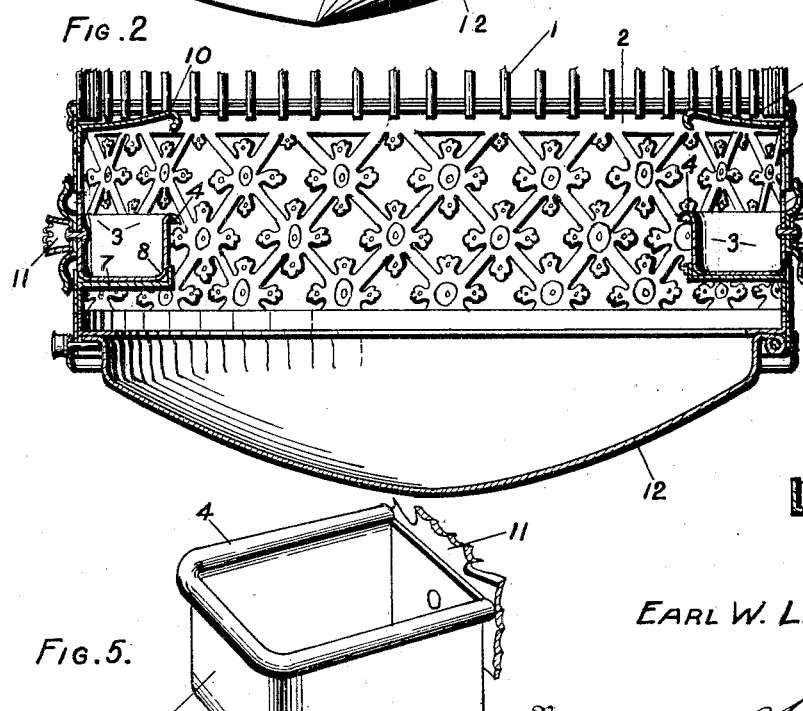
Figure 2 is an enlarged detail sectional view transversely through the lower portion of the cage and receptacles thereon.
Figure 4:
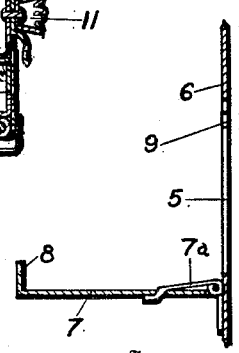
Figure 4 is a sectional view as seen along line 4—4, Fig. 3.
Figure 5:
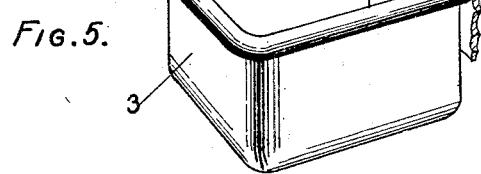
Figure 5 is a perspective view of the receptacle removed from the cage.

Referring to the drawings, the numeral 1 designates the body of a cage, at the lower end of which is a band 2 preferably in the form of a grille and which is of sufficient height and configuration to practically conceal from view any objects placed in the lower portion of the cage.

In order to provide receptacles in which to place food, water and the like, cups 3 are provided, said cups being of any suitable design and size and preferably provided with rolled edges 4, so that a bird may obtain food or drink from the cup without danger of injury to the bird.

Each cup is entered through an opening in the grille 2 and through an opening 5 in a plate 6 on the inner face of the grille or band 2 and rests upon a platform 7, extending inwardly from the plate 6, the extreme inner end of the platform 7 having an upwardly extending flange 8 for limiting the inward movement of the cup on its being inserted through the opening 5.

In order to prevent casual removal of the cup structure 3, the opening 5 is formed slightly greater in height than the height of the cup and adjacent the top portion of the opening 5, and in the side edges thereof are formed notches 9 to provide passages for the rolled edges 4 of the cup. When the cup is entered through the opening 5 and lowered until it rests on the platform 7, the outer ends of the rolled edges will strike against the solid portion of the plate 6, through which the opening 5 is formed, on an attempt to remove the cup, thus necessitating that the cup be raised until the rolled edges 4 register with the notches 9, before the cup can be removed from the cage. It will be understood that this cup structure and supporting elements therefor may be attached to the ordinary cage in the same manner as herein set forth.

The platform 7 is preferably hinged to the plate 6 or adjacent portions of a cage and has a spring 7a for swinging the platform upwardly, on the removal of the cup 3, said platform forming a closure for the opening 5 in the absence of the cup to prevent the escape of the bird through said opening.

In order to prevent the bird having bodily access to the cup 3, whereby the contents of the cup might be wasted by the bird scratching or bathing therein and prevent offal and other foreign particles from depositing therein, a canopy 10 is placed above each cup and a sufficient distance thereabove to permit the bird to introduce its head between the cup and canopy to obtain food or drink. The canopy 10 is preferably formed integral with the plate 6, at the upper portion thereof, although it will be understood that it may be made separate and secured thereto in any suitable manner.

In order to provide means for readily removing the cup from or entering the same into the opening in the cage, a handle 11 is attached to each cup, said handle member being substantially in the form of a rosette configuration, the central portion of which is so extended that it may be readily grasped as a handle for transporting the cup or for entering the same into or removing it from the cage.

The band 2 is so arranged that the bottom forming portion 12 of the cage may be hinged thereto, with the top edge of the bottom entering within the band when in closed position so that any articles carried by said bottom will be excluded from view, thus removing all unsightly objects common to the ordinary bird cage equipment.

The cup like receptacles 3 are preferably constructed of metal or other suitable non-breakable material, consequently said cups will be indestructible from use and when constructed from metal, they may be stamped into shape and produced at a very nominal cost.

What I claim is:

1. The combination with a cage structure, and a band connected therewith, said band having openings therethrough, of cup like receptacles insertable through said openings, means for supporting said cup like receptacles within the cage structure, means for preventing casual removal of the cup like structures from the cage structure and handle forming means on said cups for concealing said cup and opening and provide means for the removal of the cups.

2. The combination with a cage structure, and a band having substantially grille configurations and openings therethrough, of cup like receptacles insertable through said openings, means for supporting said cup like members within the cage structure in a manner to exclude the same from view from the exterior of the cage, and handle forming means on said cup like members.

3. The combination with a cage structure, of a band surrounding said cage structure and having openings therethrough, cup like receptacles insertable through said openings, and a support for each cup like member positioned below the lower edge of said openings and on the inner face of said band, whereby said cup like members must be bodily elevated prior to removing the same from said openings.

4. The combination with a cage structure and a grille like band surrounding the same, said band having openings therethrough, of cup like members insertable through said openings to the interior of said cage structure and removed from view, means on the band for supporting said cup like members, means for regulating the movement of said cups in either direction, and a canopy forming member extending above said cup like members.

5. The combination with a cage structure, and a band surrounding the same, said band having openings therethrough, of cup like members insertable through said openings to the interior of said cage structure, supports for said cup like members carried by said band, and handle forming members for said cups adapted to conceal the outer ends of said cups and the openings through which the cups are entered.

6. The combination with a cage structure, and a band surrounding the same, said band having openings therethrough, of receptacles insertable into said cage structure through said openings, a support for each of said receptacles, means for limiting the inward movement of said receptacles, means for preventing casual removal of the receptacles from the cage structure, and a canopy forming medium above each of said openings.

7. The combination with a cage structure having openings through the side walls thereof, of receptacles insertable into the interior of said cage structure through said openings, supports for said receptacles on the interior of said cage structure, and canopies on the interior of the cage structure and in fixed relation therewith and adapted to extend over and rest in spaced relation with said receptacles.

8. The combination with a cage structure having openings through the side walls thereof, of receptacles insertable into the interior of the cage through said openings, supports within the cage structure upon which said receptacles rest, and means for swinging said supports into position to form closures for said openings when the receptacles are removed from said openings.

9. The combination with a cage structure having openings through the side walls thereof, a canopy above each opening and fixed to the interior of the cage structure, and a support below each opening and on the interior of said cage structure, of a cup like receptacle adapted to be entered through each opening and between the canopy and support connected therewith.

10. The combination with a cage structure having openings through the walls thereof, of cups insertable into the interior of the cage structure through said openings, and means on the cups for forming closures for said openings when the cups are within the cage and exclude said cups and openings from view.

11. The combination with a cage structure having openings through the walls thereof, cups insertable through said openings, canopies within said cage structure in spaced position above said cups, supports within said cage for supporting said cups, and handle forming members on said cups adapted to conceal said openings and cups and close said openings when the cups are within the cage structure.

12. The combination with a cage structure having a band attached thereto, said band having an opening serving to receive and be closed by a receptacle inserted therethrough in drawer manner, of a drawer-like receptacle serving to be inserted through and close said opening in drawer manner, said receptacle being entirely open and free of obstructions in its upper part for convenience in refilling, emptying, and cleaning same, a canopy integrally secured to said band and extending inwardly over said receptacle when inserted, and a support extending inwardly within said cage from points adjacent the lower edge of said opening to support said receptacle when thus inserted.

In testimony whereof, I have hereto set my hand on this the 11th day of July, 1930.

EARL W. LITTLE.